(12) United States Patent
White et al.

(10) Patent No.: US 6,650,870 B2
(45) Date of Patent: Nov. 18, 2003

(54) DATA COMMUNICATION APPARATUS

(75) Inventors: Andrew W White, Spencer Wood (GB); Marc A. Borrett, Datchet (GB)

(73) Assignee: Innovision Research & Technology PLC (GB)

( * ) Notice: Subject to any disclaimer, the term of this patent is extended or adjusted under 35 U.S.C. 154(b) by 0 days.

(21) Appl. No.: 09/098,071

(22) Filed: Jun. 15, 1998

(65) Prior Publication Data

US 2002/0068528 A1 Jun. 6, 2002

Related U.S. Application Data

(63) Continuation-in-part of application No. PCT/GB96/02975, filed on Dec. 2, 1996.

(30) Foreign Application Priority Data

| Dec. 15, 1995 | (GB) | ............................................... 9525746 |
| Dec. 2, 1997 | (GB) | ................................. PCT/GB97/03318 |

(51) Int. Cl.[7] ................................................. H04B 5/00
(52) U.S. Cl. ............................. 455/41; 463/36; 463/39; 463/40; 463/43; 463/46; 273/237
(58) Field of Search ........................ 455/41; 379/55.1; 340/10.42, 825.69, 825.75, 5.61, 5.64, 10.1, 10.3, 10.34, 10.4; 375/272; 463/36, 43, 39, 40, 46; 273/237

(56) References Cited

U.S. PATENT DOCUMENTS

| 3,689,885 A | * | 9/1972 | Kaplan et al. ................. 455/41 |
| 3,760,404 A | | 9/1973 | Khiebutin |
| 4,075,632 A | | 2/1978 | Baldwin et al. |
| 4,100,451 A | | 7/1978 | Palac |
| 4,100,541 A | * | 7/1978 | Quesnell, Jr. ................ 313/404 |
| 4,441,210 A | * | 4/1984 | Hochmair et al. ............ 455/41 |

(List continued on next page.)

FOREIGN PATENT DOCUMENTS

| EP | 0455315 A2 | 11/1991 |
| GB | 2232851 A | 12/1990 |
| GB | 2308481 A | 6/1997 |
| WO | WO 95/17051 | 6/1995 |
| WO | WO 96/36134 | 11/1996 |
| WO | WO 97/03739 | 2/1997 |
| WO | WO 97/23060 | 5/1998 |

*Primary Examiner*—Nay Maung
*Assistant Examiner*—Raymond Persino
(74) *Attorney, Agent, or Firm*—Finnegan, Henderson, Farabow, Garrett & Dunner, LLP

(57) ABSTRACT

Data communication apparatus comprises a master unit (2) and at least one physically separate, passive slave unit (4). The master unit (2) has a first part (29) of an inductive communication system, and a processor (20) connected to the first part of the inductive communication system. The slave unit has a second part (40) of the inductive communication system, a data store (48), and a modulator (44,49) responsive to data from the data store and connected to the second part (40) of the inductive communication system. The first and second parts of the inductive communication system (29,40) are constructed so that when the slave unit (4) is brought into proximity with the master unit (2), power is inductively coupled from the master unit to the slave unit via the inductive communication system. The modulator (44,49) in the slave unit (4) is thereby activated to cause data from the store (48) to be inductively communicated from the slave unit (4) to the master unit (2) via the inductive communication system. The processor (20) is responsive to the data supplied to the master unit (2).

64 Claims, 7 Drawing Sheets

U.S. PATENT DOCUMENTS

| | | | |
|---|---|---|---|
| 4,654,658 A | | 3/1987 | Walton ................... 340/10.4 |
| 4,669,109 A | * | 5/1987 | Le Cheviller et al. ........ 455/41 |
| 4,729,564 A | | 3/1988 | Kuna et al. |
| 4,767,666 A | | 8/1988 | Bergeron |
| 4,792,965 A | * | 12/1988 | Morgan ................... 375/218 |
| 4,799,915 A | | 1/1989 | Lehmann et al. |
| 4,815,733 A | | 3/1989 | Yokoi |
| 4,846,693 A | | 7/1989 | Baer |
| 4,926,996 A | | 5/1990 | Eglise et al. |
| 4,941,201 A | * | 7/1990 | Davis ...................... 455/41 |
| 4,968,255 A | | 11/1990 | Lee et al. |
| 4,969,650 A | | 11/1990 | Magara et al. |
| 5,013,047 A | | 5/1991 | Schwab |
| 5,041,826 A | * | 8/1991 | Milheiser ................. 340/10.42 |
| 5,184,001 A | | 2/1993 | Levionnais |
| 5,188,368 A | * | 2/1993 | Ryan ......................... 463/39 |
| 5,188,533 A | | 2/1993 | Wood |
| 5,190,285 A | | 3/1993 | Levy et al. |
| 5,429,363 A | | 7/1995 | Hayashi |
| 5,481,257 A | | 1/1996 | Brubaker et al. |
| 5,491,715 A | * | 2/1996 | Flaxl ........................ 375/344 |
| 5,532,654 A | * | 7/1996 | Ieki et al. ................. 332/102 |
| 5,547,202 A | | 8/1996 | Tsumura |
| 5,588,678 A | | 12/1996 | Young |
| 5,701,121 A | * | 12/1997 | Murdoch ................. 340/10.34 |
| 5,724,030 A | * | 3/1998 | Urbas et al. ............. 340/10.34 |

* cited by examiner

DATA COMMUNICATION APPARATUS

This is a continuation-in-part of copending application No. PCT/GB96/02975, filed Dec. 2, 1996.

The invention relates to a data communication apparatus of the kind comprising a master unit and at least one physically separate, passive slave unit. The invention is concerned particularly, but not exclusively, with toys and games.

A number of electronic toys and games exist in which information cards or pieces are placed on a base, which base reads information off the pieces and provides an output such as verbal messages. A difficulty is that the base only contains a preprogrammed memory and can only perform the tasks it is made to do.

U.S. Pat. No. 5,190,285 describes an electronic game having a base and separate playing pieces or characters, each character containing a store for storing data which can be transferred to a processor attached to the base. The character is supplied with power via coils in the character and base respectively and communicates the data through a coupled capacitor plate. This is a relatively complex construction and in practice the use of capacitive coupling will result in very weak signals being transferred which is undesirable.

In accordance with the present invention, data communication apparatus comprises a master unit and at least one physically separate, passive slave unit, the master unit having a first part of an inductive communication system, and a processor connected to the first part of the inductive communication system, and the slave unit having a second part of the inductive communication system, a data store, and a modulator responsive to data from the data store and connected to the second part of the inductive communication system, wherein the first and second parts of the inductive communication system are constructed so that when the slave unit is brought into proximity with the master unit, power is inductively coupled from the master unit to the slave unit via the inductive communication system, and the modulator in the slave unit is thereby activated to cause data from the store to be inductively communicated from the slave unit to the master unit via the inductive communication system, the processor being responsive to the data supplied to the master unit.

With this invention, the inductive communication system is utilized both for supplying power to the slave unit and for receiving data from the slave unit. This results in a simpler construction, particularly for the slave unit.

In principle, any RF inductive communication system could be used but in the preferred arrangement, the inductive communication system comprises a tuned circuit. The use of a tuned circuit maximises power transfer and the phase change detected as well as increasing the selectivity of the apparatus so that a slave unit will only pass data to the master unit when they are in close proximity.

In this case, the modulator is preferably adapted to adjust the resonant frequency of the tuned circuit in accordance with data supplied from the data store. Effectively, the inductive arrangement defined by the tuned circuit is either tuned or detuned in accordance with the data. Detuning the system adjusts the tuned circuit's resonant frequency which can be detected as a phase shift in the received signal relative to the drive signal fed to the tuned circuit by the processor.

In the preferred arrangement the processor generates a drive signal, at a drive frequency, which is fed to the first part of the tuned circuit, the tuned circuit being adapted to resonate at a frequency offset from the drive frequency when no data is being transmitted to the master unit, such that the tuned circuit oscillates at a frequency which is phase shifted relative to the drive frequency. The advantage of this offset is that in the case of binary data, whichever value the binary data has, there will be a phase shift in the received signal.

Typically, the frequency offset will be small, no more than 5%, preferably no more than 3.5%, of the resonant frequency of the drive frequency.

Typically, the modulator is responsive to binary data from the data store either to adjust or not to adjust the resonant frequency of the tuned circuit in accordance with the value of the data.

Conveniently, where the resonant frequency of the tuned circuit is offset from the drive frequency, the non-adjusted and adjusted resonant frequencies of the tuned circuit are on either side of the drive frequency. This provides a symmetrical arrangement which enhances detection.

It will be understood that the use of a phase change yields good noise immunity, comparable to FM modulation, in contrast to known amplitude modulation techniques.

In principle, the data stored in the data store could be fed directly to the modulator but in some cases this could introduce difficulties where successive digits have the same value leading to a DC level. To overcome this, preferably, the slave unit comprises a unit for converting each binary digit from the store into a two bit sequence in which the values of the bits are different, the order within the sequence varying depending upon the value of the binary digit from the data store. The converting unit could comprise, for example, an exclusive-OR gate.

This approach ensures that every binary digit received from the data store causes a variation in the manner in which the tuned circuit is modulated. For example, a binary value 1 from the data store could be converted to a sequence "10" while a binary value "0" could be converted to "01".

Typically, the modulator comprises a switch for including one or more reactive elements into the tuned circuit, such as an additional capacitor. Conveniently, the modulator comprises a field effect transistor.

As previously mentioned, the master unit conveniently further comprises a phase comparator which receives a signal at the drive frequency, and the signal returned from the tuned circuit and generates an output signal related to the phase difference between the two input signals.

Typically, the master unit will also further comprise a converter unit connected to the output of the phase comparator for generating a pulse width modulated signal related to the phase difference defined by the signal output by the phase comparator. The converter unit could comprise an exclusive-OR gate as is known in the art.

The data stored in the data store can define a variety of types of information. For example, the data could define a programme to which the processor in the master unit responds. Typically, however, the master unit includes at least one output device adapted to generate one or more of an electrical, visual, audible and mechanical output under control of the processor, in response to data received from the slave unit.

It will be appreciated that the invention is particularly suited for use as a toy or game, the or each slave unit being incorporated in a toy character, model or card. The advantage of this is that a common master unit can be provided for use with a variety of toys or models each of which stores data related to the particular toy or model. For example, if the slave unit is incorporated in a toy character, the data stored in the data store may define an audio message intended to be the character speaking.

The invention has advantages for a toy manufacturer. One main advantage is that a user can acquire in the first instance a base containing the master unit and one set of pieces, each containing a respective slave unit, which together form one toy. But once a user is in possession of a base, a new toy can later be made by supplying a new set of pieces with different information in their respective data stores. Thus for example a first toy might consist of a base and a plurality of pieces in the form of well known cartoon characters which convey verbally to the user their name. The manufacturer could then supply different pieces such as models of different aeroplanes which could be provided in their respective data stores with a brief verbal description about their history. It is also envisaged that the information in the data store might form a programme to programme the processor, in the master unit. A toy might thus include one piece which programmes the processor to form the basis of the actions of the toy, and other pieces (which have less information in their respective data stores) could then be read by the processor once programmed. The processor could then become more sophisticated and cause mechanical actions to take place in addition to or as an alternative to audible and visual outputs.

In further arrangements, the processor could be linked to a further computer to form more complex toys. It should also be noted that although the invention has particular application to toys and games, it could also form part of an educational aid.

In other applications, the Tag could be used to provide information about an object, such as a file, to which it is attached. For security applications, the Tag could store a sample of the bearer's voice for comparison with the bearer and/or information only known to the bearer. Many other audio/musical applications are possible.

In general the data store will be a ROM but in some cases a reprogrammable store could be used.

Two examples of toys incorporating a data communication apparatus according to the invention will now be described with reference to the accompanying drawings, in which.

Figure 1:
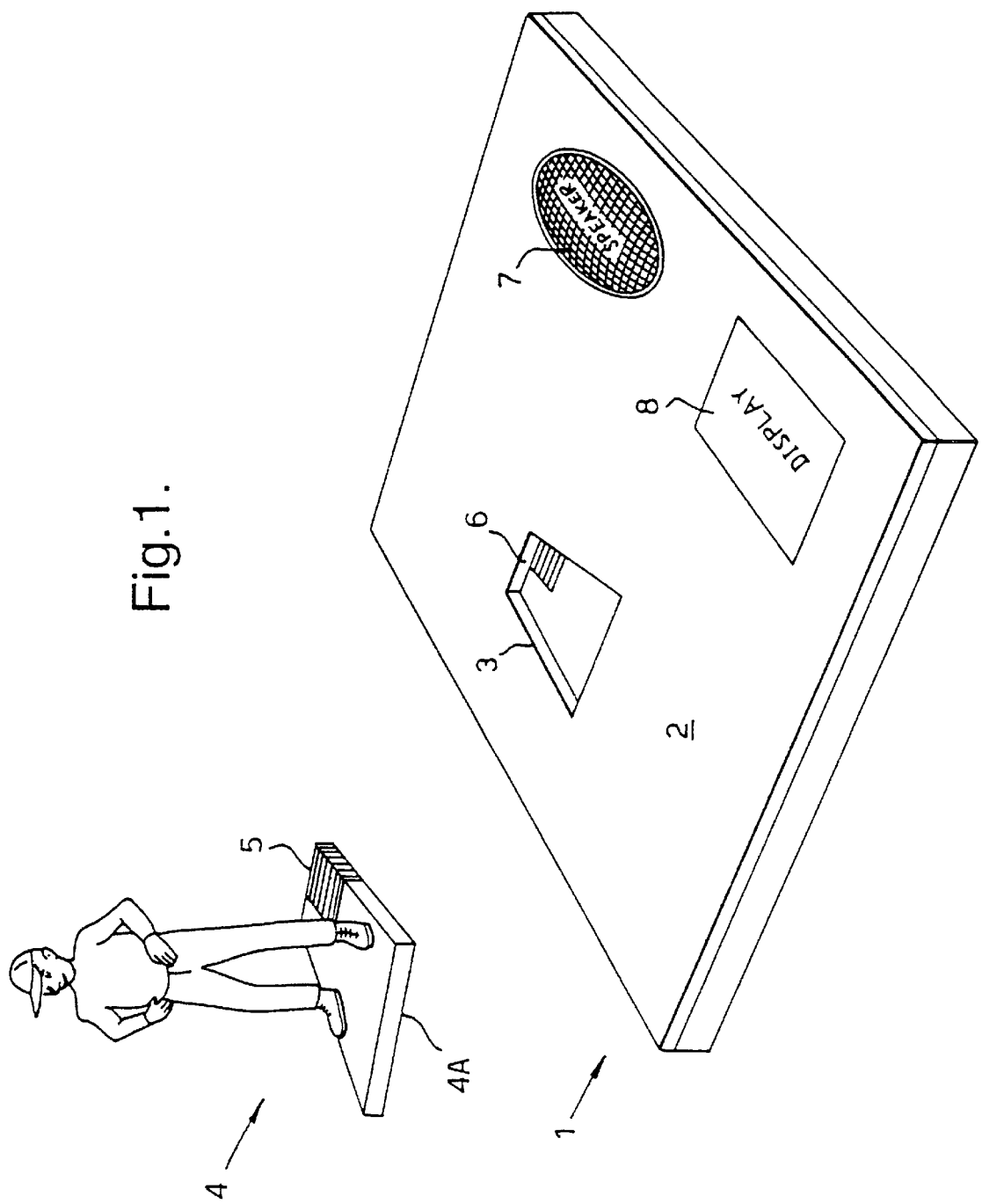
FIG. 1 is a perspective view from above of a first example of the toy.

Referring to FIG. 1 there is shown a toy having a base unit 1 in the form of a rectangular housing moulded, for example, out of plastics. On the upper surface 2 is a recessed portion 3 trapezoidal in shape to receive a corresponding trapezoidal base 4a of a piece in the form of a character 4 e.g. a cartoon or other fictitious character. The base 4a and recess portion 3 are trapezoidal so that the base 4a only fits into the recess portion if it is orientated into the correct position.

Figure 3:
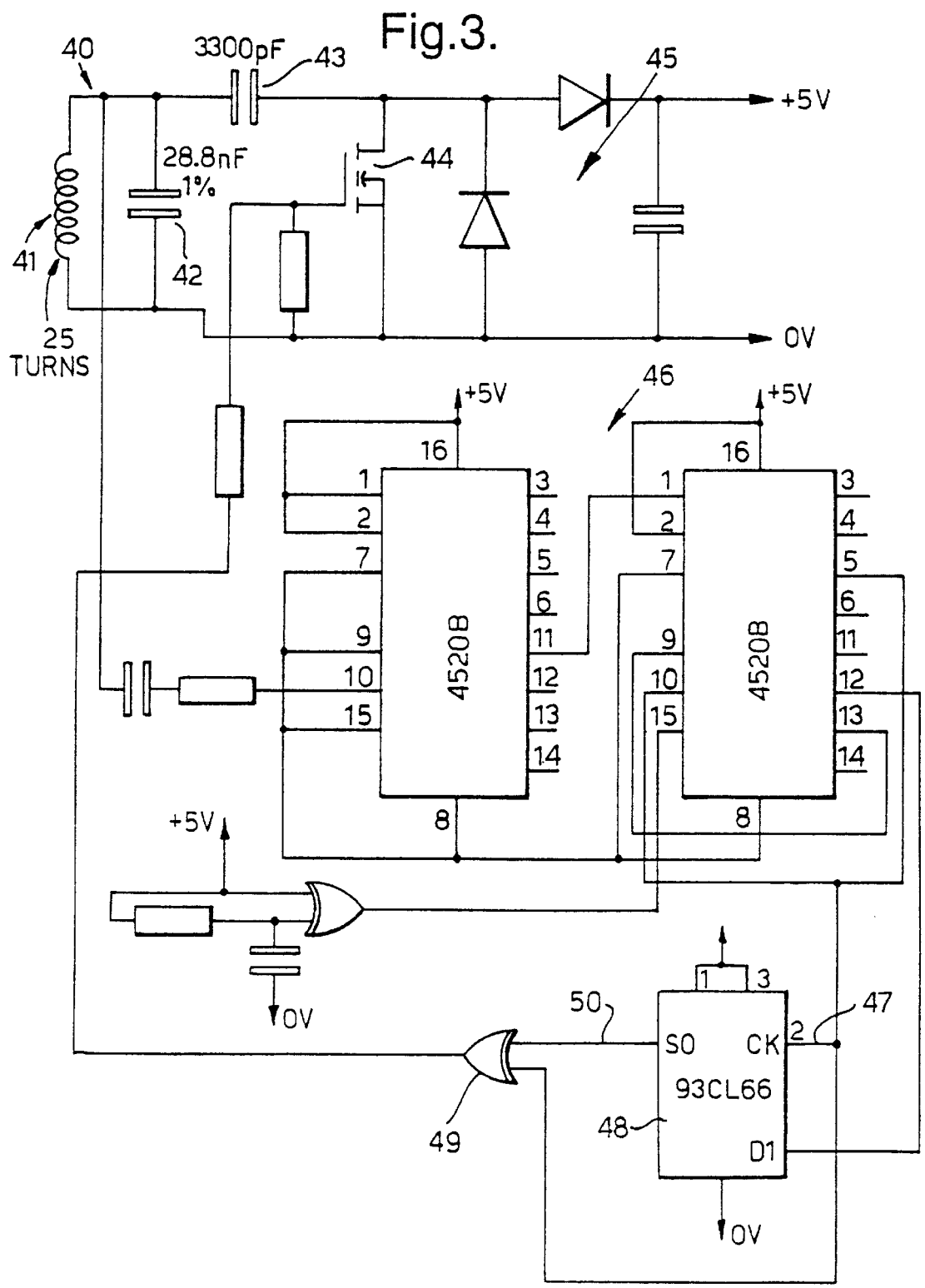
FIG. 3 is a circuit diagram showing the components within the character of FIG. 1.

Inside the base portion 4a of character 4 is a Tag 5 including a slave unit defined by an electronic circuit shown in more detail in FIG. 3. The Tag 5 is remotely activatable from energy transmitted thereto and, when activated, transmits information contained in its memory.

Figure 2:
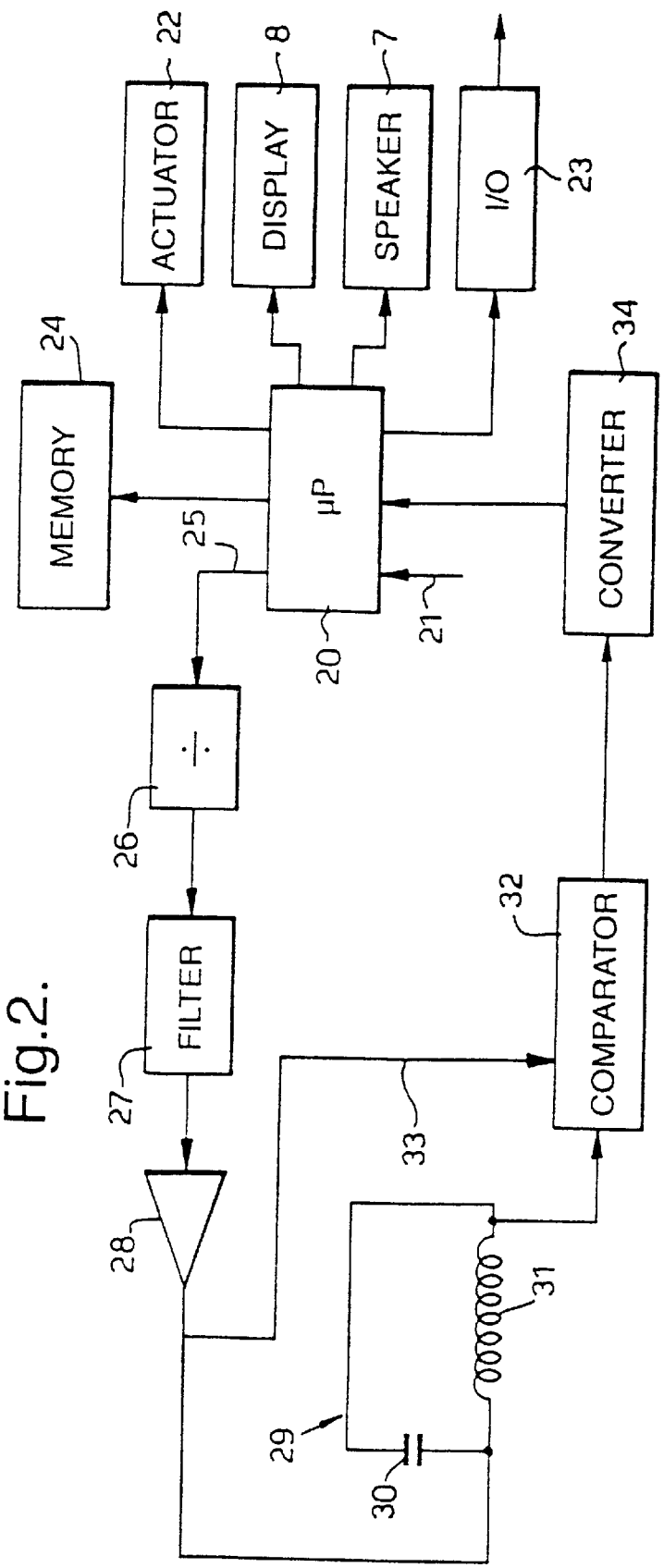
FIG. 2 is a block circuit diagram of the primary components in the base unit shown in FIG. 1.

Mounted inside the base unit 2 is a master unit shown in more detail in FIG. 2. The master unit includes a Tag reader, part of which is shown at 6 in one corner of the recessed portion 3. The Tag reader is connected to a speaker 7 and display 8. Batteries (not shown) may be used to power the reader speaker 7 and display 8, which batteries may be housed in the base unit 1.

In use of the device of FIG. 1, the character 4 is placed in the recess portion 3 on surface 2 of the base unit 1. The Tag 5 will thus lie adjacent the part 6 of the reader 6. The Tag 5 contains information about the character in for example compressed speech form which is read by the reader. This information is then displayed visually on display 8 and/or speech is transmitted through speaker 7. Such information could include a brief story about the character or the character's name and what it does for example.

It is envisaged that the base unit 1 could be fabricated and sold with one or more characters. The owner could then purchase or otherwise acquire different characters each with the ability to convey different information.

The components of the Tag reader are shown in more detail in FIG. 2. The reader comprises a microprocessor powered from batteries (not shown) along a power line 21. The microprocessor 20 is connected to the display 8 and the speaker 7 and, although not shown in FIG. 1, may also be connected to a mechanical actuator 22 and an I/O interface 23 for connection to a remote computer (not shown). The microprocessor 20 is controlled via software stored in a memory 24. The microprocessor generates a clock signal on a line 25 at a rf frequency, e.g. 16 MHz, which is fed to a divider circuit 26 which reduces the frequency of the signal to 125 kHz. This drive or "carrier" signal is filtered in the filter 27 and amplified by an amplifier 28 before being fed to a first part 29 of a tuned circuit. The first part 29 of the tuned circuit includes a capacitor 30 and a 25 turn inductor 31. In this example, the capacitor 30 has a value of 39.8 nF.

The circuit 29 is connected to one input of a phase comparator 32, the other input of which receives the carrier frequency on a line 33. The comparator 32 compares the phases of the two input signals and generates a binary output signal whose state corresponds to the determined phase difference. This signal is fed to a converter circuit 34, typically in the form of any exclusive-OR gate which converts the input signal into a pulse width modulated (PWM) signal which is fed to the microprocessor 20. The microprocessor 20 responds to that signal to control one or more of the speaker, display, actuator and I/O interface 7,8,22,23.

FIG. 3 illustrates the components within the character 4 defining the slave unit. The circuit comprises a second part 40 of the tuned circuit, formed by a 25 turn inductor 41 and a capacitor 42 having a value in this example of 28.8 nF. The circuit 40 is connected in series to a further capacitor 43 having a value of 3300 pF and in parallel with a FET 44. The output from the circuit 40 is connected to a rectifying circuit 45 formed by two diodes and a capacitor which generates a DC power signal of 5V for use by the other components within the slave unit. It should be noted that the slave unit has no internal power source of its own.

The output from the circuit 40 is also fed to a divider arrangement 46 of conventional form from which a clock signal (typically 16 Kbits/sec) is derived which is fed to the clock input 47 of a serial ROM 48 and to one input of an exclusive-OR gate 49. Data is clocked out of an output 50 of the serial ROM 48 at half the clock rate and is fed to the other input of the exclusive-OR gate 49. The output from the exclusive-OR gate 49 is fed to the gate of the FET 44.

When the character 4 is brought into proximity with the recess 3, the part 6 of the Tag reader (corresponding to part or all of the coil 31) will be brought into proximity with the coil 41 and the tuned circuit comprising the first and second parts 29,40 will be completed. This effectively forms an inductive link between the first and second parts of the tuned circuit.

Thus the application of the drive signal to the first part 29 of the tuned circuit causes an oscillating magnetic field to be generated by the coil 31. As long as the first and second parts 29, 40 of the tuned circuit are sufficiently close, the magnetic field will induce a current in the coil 41 of the second part of the tuned circuit. This current is used to power the processes in the character 4, as mentioned below, and to generate a further magnetic field in the coil 41. This further magnetic field interacts with the field generated by the coil 31, and as a result, changing the magnetic field generated by the coil 41 results in a change in the resonant frequency of the tuned circuit.

However, the magnitude of a magnetic field follows the inverse square law and decreases proportionally to the square of the distance from the source. Accordingly, if the first and second parts 29, 40 of the tuned circuit are not sufficiently close, the current generated in the coil 41 will be insufficient to power the character circuitry and the system will not function.

The resonant frequency of the tuned circuit is slightly different from that of the carrier or drive signal. Accordingly, the circuit will oscillate at the frequency of the drive signal with a phase offset to that of the drive signal such that the comparator 32 will detect a phase difference between the two. Following conversion of this phase difference by the converter 34 to a PWM signal, the state output by the comparator 32 will be detected by the microprocessor 20. The microprocessor 20 will then momentarily inhibit generation of the carrier frequency to allow the slave unit within the character to reset following which the carrier frequency is restarted.

On re-start, power will be coupled from the reader to the Tag via the tuned circuit and will be rectified by the rectifying circuit 45 so as to generate a 5V supply. The alternating signal generated by the tuned circuit will also be fed to the divider 46 from which the clock is obtained causing data to be clocked out of the serial ROM 48. Since the data is clocked out of the serial ROM 48 at half the clock rate, each data bit applied to the exclusive-OR gate 49 will remain applied while the other input of the exclusive-OR gate 49 receives two clock signals of complementary value. Thus, the output of the exclusive-OR gate 49 will be two bits either "01" if the data bit on the input 50 is a "0" or "10" if the data bit on the line 50 is a "1".

Figure 6A:
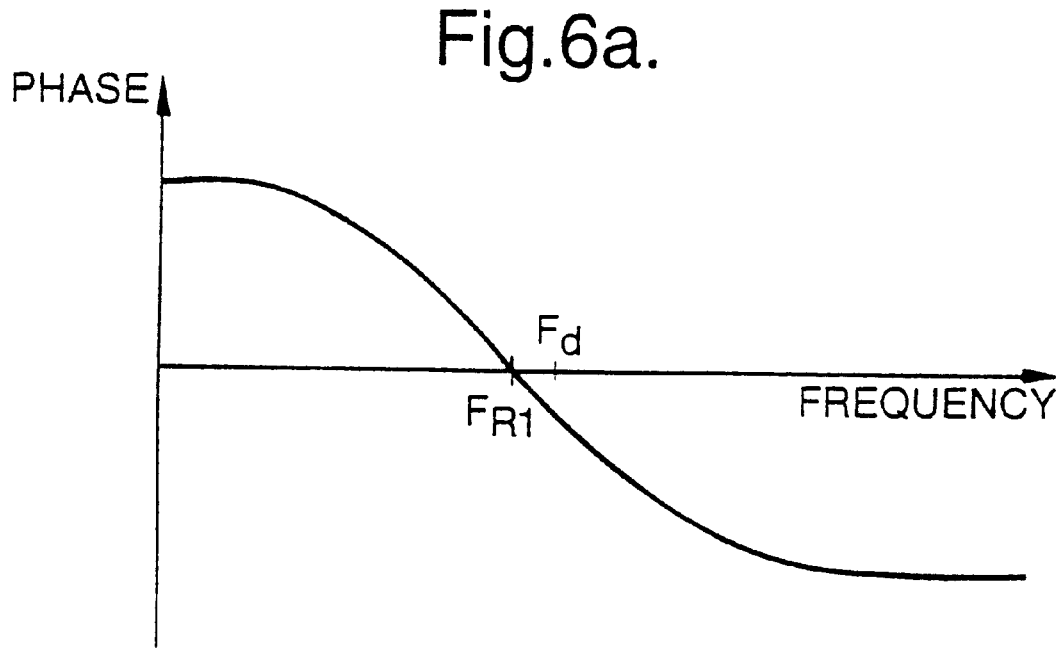
FIG. 6a is a representation of the frequency response of the tuned circuit with the character transmitting data "1"
Figure 7A:
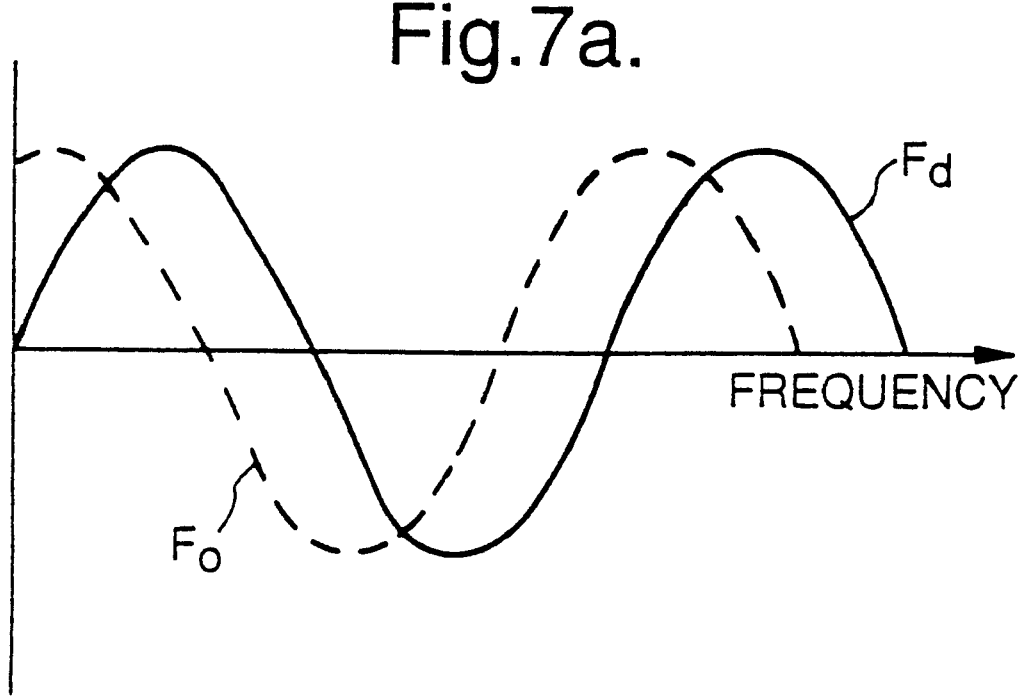
FIG. 7a is a representation of the phase change of oscillation of the tuned circuit compared to that of the drive signal with the character transmitting data "1"; and, FIG. 7b is a representation of the phase change of the tuned circuit compared to that of the drive signal with the character transmitting data "0".

The output from the exclusive-OR gate 49 is fed to the gate of the FET 44 with a value of "1" turning the gate on and a value of "0" turning the gate off. When the gate is turned on, the capacitor 43 will be effectively inserted into the tuned circuit thus decreasing its resonant frequency $F_{R1}$ slightly below the frequency of the drive signal $F_d$, as shown in FIG. 6a. Accordingly, as shown in FIG. 7a, which shows the drive signal Fd and the oscillation frequency $F_o$, the tuned circuit will oscillate at the frequency of the drive signal with a phase lag compared to that of the drive signal. The comparator 32 detects this phase lag and determines that the data transferred from the character 4 is a binary "1".

Figure 6B:
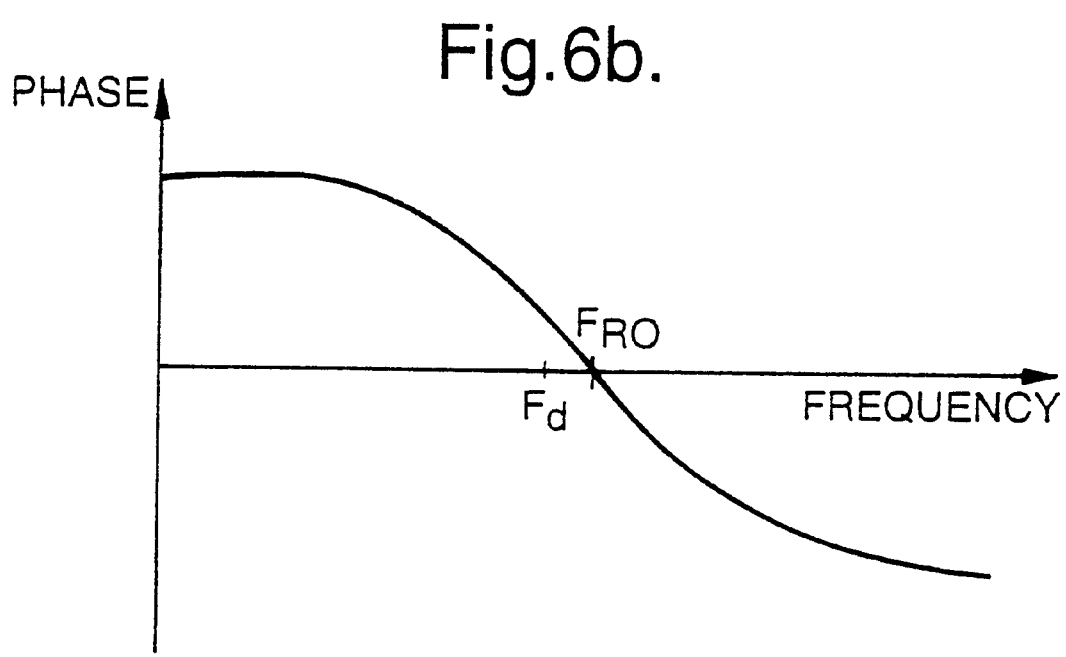
FIG. 6b is a representation of the frequency response of the tuned circuit with the character transmitting data "0"
Figure 7B:
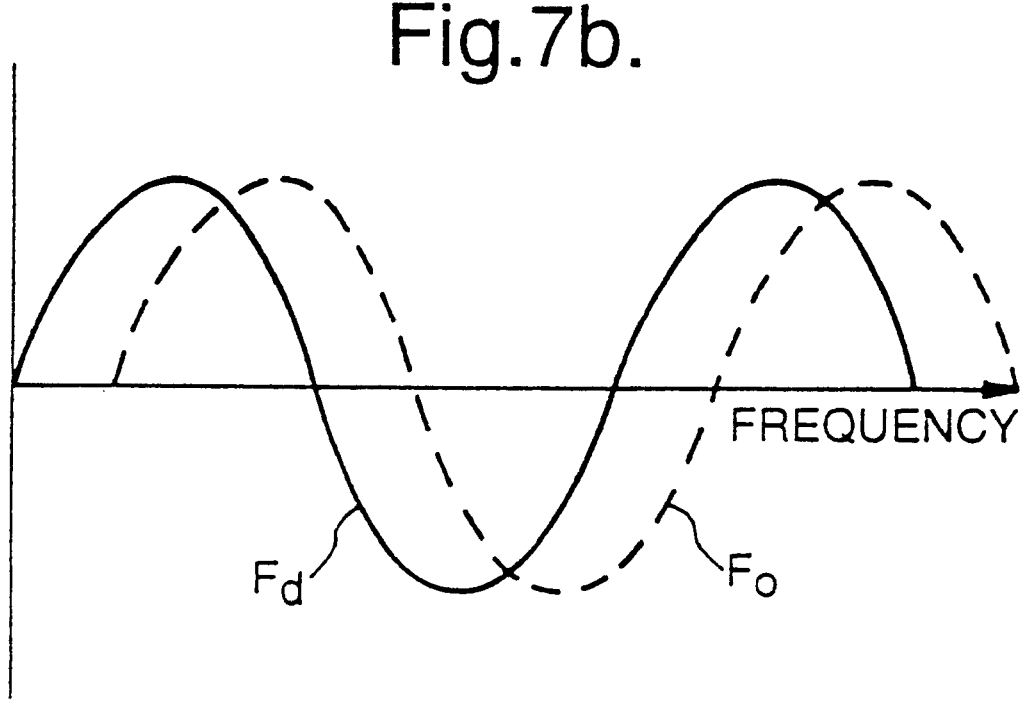

If the output from the exclusive-OR gate 49 is a binary "0" then the gate of the FET 44 will remain open and the tuned circuit maintains its normal resonant frequency $F_{R0}$, slightly more than that of the drive signal $F_d$, as shown in FIG. 6b. Accordingly, as shown in FIG. 7b, which shows the drive signal $F_d$ and the oscillation frequency $F_o$, the tuned circuit will oscillate at the frequency of the drive signal with a phase advance compared to that of the drive signal. The comparator 32 detects this phase advance and determines that the data transferred from the character 4 is a binary "0".

The oscillation frequency of the tuned circuit will thus vary in phase relative to the input carrier from the amplifier 28, depending upon its resonant frequency, the difference in phase between the two conditions (binary "1" and binary "0" from the exclusive-OR gate 49) being typically about 30°.

The difference in phase is detected by the comparator 32, as explained above, and a signal is generated by the comparator 32 defining the phase difference which is fed to the converter 34 which in turn generates a pulse width modulated signal which is fed to the microprocessor 20.

The response of the microprocessor 20 to the signal from the converter 34 will depend upon the type of information being transmitted. Typically, the serial ROM 48 will contain header information which is initially downloaded to the microprocessor 20 and this will define the type of data which is to follow, for example programme data, display data, audio data or the like. The microprocessor 20 responds to the header information by processing the following data as appropriate.

If the following data defines a programme then it will be fed, if necessary after further modification by the microprocessor 20, to the memory 24 for storage, following which the microprocessor 20 will carry out the stored programme.

If the data defines audio information, for example it may comprise compressed audio data, the microprocessor 20 will decompress the data and then apply appropriate control signals to the speaker 7 which will generate an audio message.

If the data defines display information, typically in compressed form, the microprocessor 20 will decompress that data and convert it into suitable control signals (for example R, G, B signals) which are then applied to the display 8 which typically comprises a monitor.

If the data comprises mechanical movement data, the microprocessor 20 will generate from it suitable control signals which are fed to the actuator 22. The actuator 22 may be connected to an arm or signal or the like.

In addition the data may be at least temporarily stored.

Figure 4:
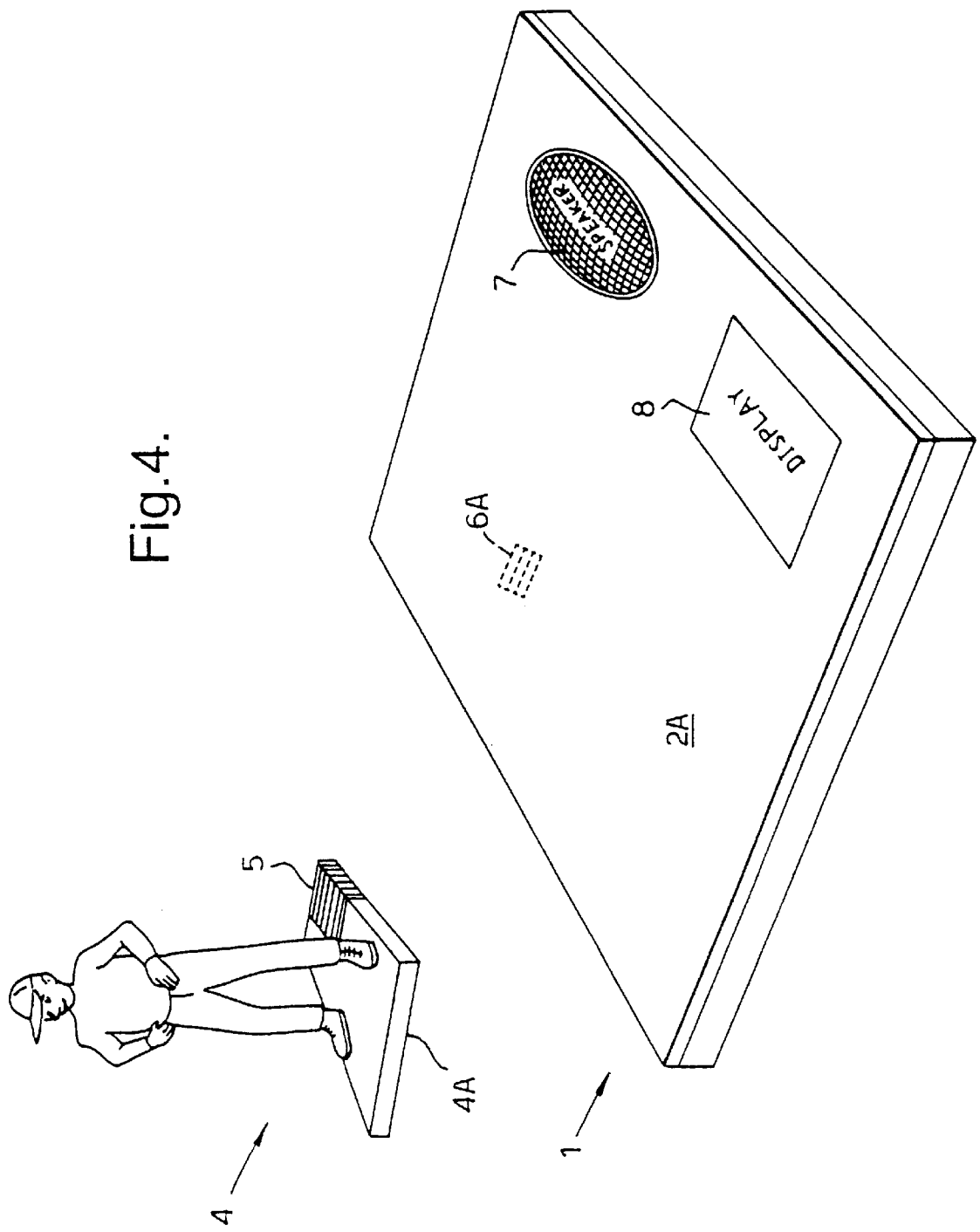
FIG. 4 is a view similar to FIG. 1 but of a second example.

Instead of the pieces being in the form of characters or models, they could simply be cards or other objects incorporating slave units. In such an instance the recessed portion 3 on surface 2 might take a different form to accommodate the cards. It is pointed out that it is not essential for the surface of the base unit 1 to have a recess portion to receive the pieces. Thus, as shown in FIG. 4, the base unit 2A has no recess, the Tag Reader part 6A being positioned under the surface of the base unit. Also it is not essential for the reader to be adjacent and in close proximity to the Tag in a piece in order for the reader to interface with the Tag. The reader and Tag could be distanced apart, for example by up to 2 cm.

In a further application, the game could involve a ball and goal, a slave unit incorporated in the ball and a master unit in or adjacent to the goal. When the ball passes into the goal, data is transmitted to the master unit which will thus detect a goal scored and optionally generate relevant information obtained from the slave unit store.

The master unit could also include its own data which is used to control one or more of the output devices either separately from or with data from the slave unit.

Figure 5:
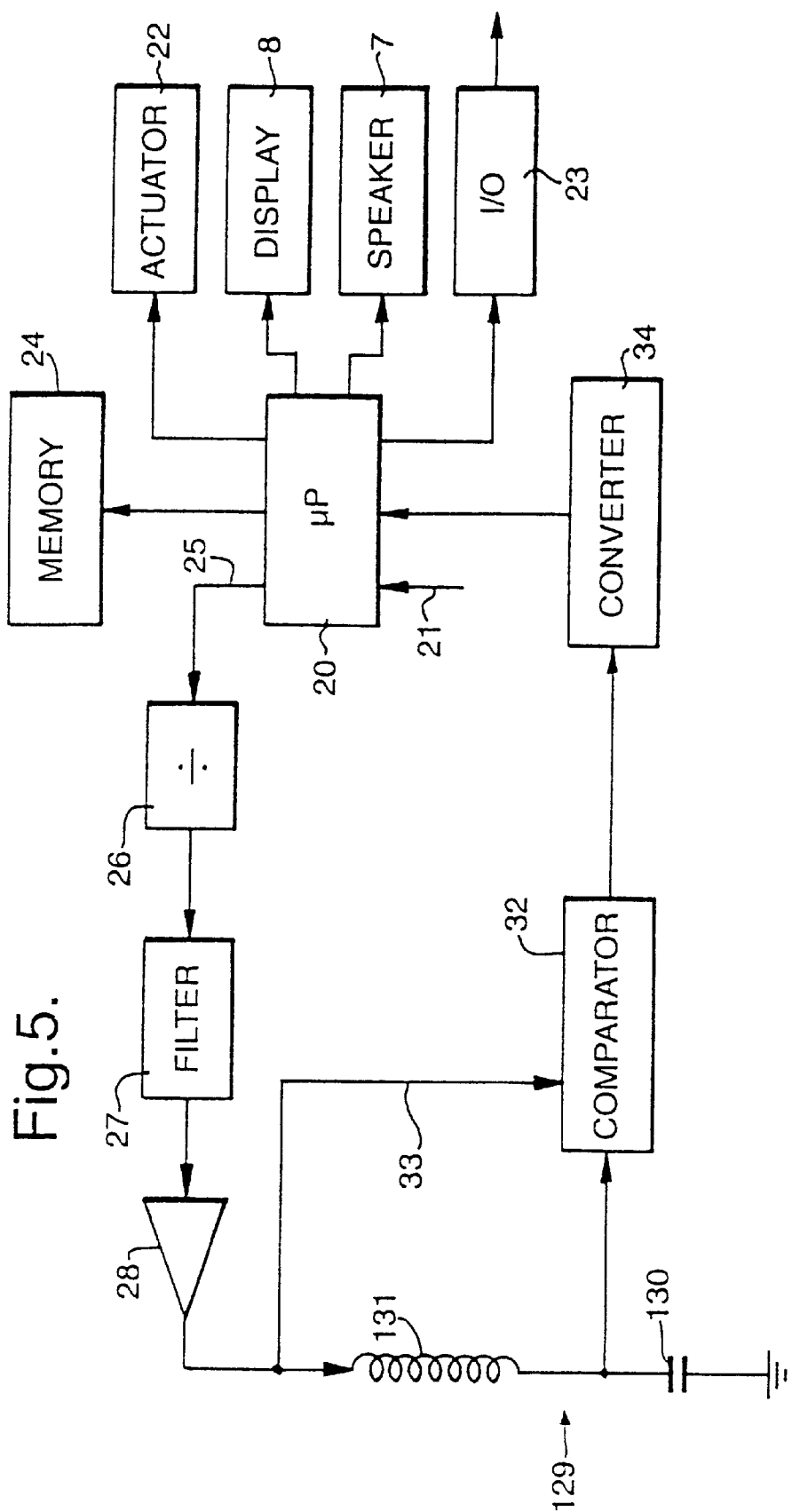
FIG. 5 is a block circuit diagram of alternative primary components in the base unit shown in FIG. 1.

It will be realised that any suitable tuned circuit that allows inductive coupling between the master unit and the character 4 could be used. An alternative example of such a circuit is shown in FIG. 5. This apparatus is similar to that of FIG. 2, with the first part 29 of the tuned circuit replaced by an alternative first part 129 of a tuned circuit. The first part 129 comprises a 25 turn inductor 131 coupled to the comparator 32 and the output of the amplifier 28. A capacitor 130 is coupled from the connection between the inductor 131 and the comparator 32 to ground, for optimising the resonant frequency of the first part 129 of the tuned circuit.

What is claimed is:

1. A games apparatus comprising a base module and a games component, the base module comprising:
    a housing associated with a games component surface for a games component and also associated with an output device configured to provide output data to a user;
    a reader comprising a processor configured to control the provision of a drive signal at a predetermined frequency and to control operation of the output device to provide output data to the user; and
    a first inductive circuit portion positioned adjacent the games component surface and coupled to receive the drive signal, the games component comprising:
        a memory storing data;
        a second inductive circuit portion that couples inductively to the first inductive circuit portion when the games component is placed on or is in proximity to the games component surface;
        a power deriver coupled to the second inductive circuit portion to derive a power supply from the inductive coupling of the drive signal to the second inductive circuit portion;
        a data reader configured to read data from the memory in response to the power deriver deriving the power supply from the inductive coupling of the drive signal to the second inductive circuit portion; and
        a modulator configured to vary a loading on the second inductive circuit portion in accordance with the data read by the data reader whereby, in operation, the inductive coupling of the first and second inductive coupling portions causes a phase of the drive signal in the first inductive circuit portion to be modulated in accordance with the variation in loading on the second inductive circuit portion to produce a phase-modulated signal;
    and the base module reader further comprising:
        a phase modulation detector coupled to the first inductive circuit portion to receive the phase-modulated signal and also coupled to receive the drive signal, the phase modulation detector being arranged to compare the drive signal and the phase modulated signal to detect the phase modulation; and
        a converter coupled to the phase modulation detector and to the processor to provide to the processor a data signal representing the phase modulation of the drive signal detected by the phase modulation detector and thus representing the data read by the data reader of the games component, the processor being configured to control the output device in accordance with the data signal received from the converter.

2. The games apparatus according to claim 1 wherein the first and second inductive circuit portions comprise a tuned circuit.

3. The games apparatus according to claim 2, wherein the tuned circuit is adapted to resonate at a frequency offset from the drive frequency when no data is being transmitted to the base module, such that the tuned circuit resonant frequency is phase shifted relative to the drive frequency.

4. The games apparatus according to claim 3 wherein the resonant frequency of the tuned circuit is offset by up to 3.5% from the drive frequency.

5. The games apparatus according to claim 4, wherein the modulator is responsive to data from the memory selectively to adjust the resonant frequency of the tuned circuit.

6. The games apparatus according to claim 3, wherein the modulator is responsive to data from the memory selectively to adjust the resonant frequency of the tuned circuit.

7. The games apparatus according to claim 6, wherein the modulator is responsive to binary data from the memory either to adjust or not to adjust the resonant frequency of the tuned circuit in accordance with the value of the data.

8. The games apparatus according to claim 7, wherein the non-adjusted and adjusted resonant frequencies of the tuned circuit are on either side of the drive frequency.

9. The games apparatus according to claim 2, wherein the modulator is responsive to data from the memory selectively to adjust the resonant frequency of the tuned circuit.

10. The games apparatus according to claim 9, wherein the modulator is responsive to binary data from the memory either to adjust or not to adjust the resonant frequency of the tuned circuit in accordance with the value of the data.

11. The games apparatus according to claim 1, wherein the memory comprises binary data, the games component further comprising a unit for converting each binary digit from the memory into a two bit sequence in which the values of the bits are different, the order within the sequence varying depending upon the value of the binary digit from the memory.

12. The games apparatus according to claim 11, wherein the converting unit comprises an exclusive-OR gate.

13. The games apparatus according to claim 11, wherein the modulator comprises a field effect transistor.

14. The games apparatus according to claim 1, wherein the output device is adapted to generate one or more of an electrical, visual, audible and mechanical output under control of the processor, in response to data received from the games component.

15. The games apparatus according to claim 1, wherein a plurality of games components are provided, each storing different data in its memory.

16. The games apparatus according to claim 1 in the form of a toy.

17. The games apparatus according to claim 16, wherein the games component is provided as a toy character or model or card.

18. The games apparatus according to claim 17 wherein the games component surface comprises a recess shaped to receive the character, model.

19. The games apparatus according to claim 1, wherein the games apparatus is a toy and the games component is a toy component.

20. The games apparatus according to claim 1, wherein the games component is a toy or card.

21. A games apparatus comprising a base module and a games component, the base module comprising:
    a housing associated with a games component surface for supporting a games component and also associated with a display configured to display output data to a user;
    a reader comprising a processor configured to control the provision of a drive signal at a predetermined frequency and to control operation of the display; and
    a first inductive circuit portion positioned adjacent the games component surface and coupled to receive the drive signal;

the games component comprising:
a memory storing display data, a second inductive circuit portion that couples inductively to the first inductive circuit portion when the games component is placed on or is in proximity to the games component surface, a power deriver coupled to the second inductive circuit portion to derive a power supply from the inductive coupling of the drive signal to the second inductive circuit portion, a data reader configured to read display data from the memory in response to the power deriver deriving a power supply from the inductive coupling of the drive signal to the second inductive circuit portion, and a modulator configured to vary a loading on the second inductive circuit portion in accordance with the display data read by the data reader whereby in operation the inductive coupling of the first and second inductive coupling portions causes the drive signal in the first inductive circuit portion to be modulated in accordance with the variation in loading on the second inductive circuit portion to produce a display data modulated signal;

and the base module reader further comprising:
a modulation detector coupled to the first inductive circuit portion to receive the modulated signal, the modulation detector being configured to detect the modulation and to provide a data signal representing the detected modulation and thus the display data read by the data reader of the games component, the modulation detector also being coupled to supply the data signal to the processor, the processor being configured to control the display to display an image in accordance with the data signal received from the modulation detector and representing display data stored in the memory of the games component.

22. The games apparatus according to claim 21, wherein the memory stores compressed display data and the processor is configured to decompress the compressed data represented by the data signal received from the modulation detector.

23. The games apparatus according to claim 21, wherein the games component is selected from one of a Figure, toy character, model and card.

24. The games apparatus according to claim 21, wherein the games apparatus is a toy and the games component is a toy component.

25. The games apparatus according to claim 21, wherein the games component is a toy or card.

26. A games apparatus comprising a base module and a games component, the base module comprising:
a housing associated with a games component surface for a games component and also associated with a loudspeaker configured to output an audio signal to a user;
a reader comprising a processor configured to control the provision of a drive signal at a predetermined frequency and to control operation of the loudspeaker; and
a first inductive circuit portion positioned adjacent the games component surface and coupled to receive the drive signal;
the games component comprising:
a memory storing audio data;
a second inductive circuit portion that couples inductively to the first inductive circuit portion when the games component is placed on or is in proximity to the games component surface;
a power deriver coupled to the second inductive circuit portion to derive a power supply from the inductive coupling of the drive signal to the second inductive circuit portion;
a data reader configured to read audio data from the memory in response to the power deriver deriving a power supply from the inductive coupling of the drive signal to the second inductive circuit portion; and
a modulator configured to vary a loading on the second inductive circuit portion in accordance with the audio data read by the data reader whereby in operation the inductive coupling of the first and second inductive coupling portions causes the drive signal in the first inductive circuit portion to be modulated in accordance with the variation in loading on the second inductive circuit portion to produce an audio data modulated signal;

and the base module reader further comprising:
a modulation detector coupled to the first inductive circuit portion to receive the modulated signal, the detector being configured to detect the modulation and to provide a data signal representing the detected modulation and thus the audio data read by the data reader of the games component, the modulation detector also being coupled to supply the data signal to the processor, the processor being configured to control the loudspeaker to emit an audio signal in accordance with the data signal received from the modulation detector and representing audio data stored in the memory of the games component.

27. The games apparatus according to claim 26, wherein the memory stores compressed audio data and the processor is configured to decompress the compressed audio data represented by the data signal received from the modulation detector.

28. The games apparatus according to claim 26, wherein the games component is selected from one of a Figure, toy character, model and card.

29. The games apparatus according to claim 26, wherein the games apparatus is a toy and the games component is a toy component.

30. The games apparatus according to claim 26, wherein the games component is a toy or card.

31. A games apparatus comprising a base module and a games component, the base module comprising:
a housing associated with a games component surface for a games component and also associated with an output device comprising a display and a loudspeaker;
a reader comprising a processor configured to control the provision of a drive signal at a predetermined frequency and to control operation of the display and loudspeaker; and
a first inductive circuit portion positioned adjacent the games component surface and coupled to receive the drive signal;
the games component comprising:
a memory storing speech data in compressed form;
a second inductive circuit portion that couples inductively to the first inductive circuit portion when the games component is placed on or is in proximity to the games component surface;
a power deriver coupled to the second inductive circuit portion to derive a power supply from the inductive coupling of the drive signal to the second inductive circuit portion;
a data reader configured to read compressed speech data from the memory in response to the power deriver deriving a power supply from the inductive coupling of the drive signal to the second inductive circuit portion; and a modulator configured to vary a loading on the second inductive circuit portion in accordance with the compressed speech data read by the data reader whereby in operation the inductive coupling of the first and second inductive coupling portions causes the drive signal in the first inductive circuit portion to be modulated in accordance with the variation in loading on the second inductive circuit portion to produce a compressed speech data modulated signal;

and the base module reader further comprising:

a modulation detector coupled to the first inductive circuit portion to receive the modulated signal, the detector being configured to detect the modulation and to provide a data signal representing the detected modulation and thus the compressed speech data read by the data reader of the games component, the modulation detector also being coupled to supply the data signal to the processor, the processor being configured to decompress the compressed speech data and to control at least one of the loudspeaker to output an audio signal and the display to provide a visual representation of the speech data stored in the memory of the games component.

32. The games apparatus according to claim 31, wherein the games component is selected from one of a Figure, toy character, model and card.

33. The games apparatus according to claim 31, wherein the games apparatus is a toy and the games component is a toy component.

34. The games apparatus according to claim 31, wherein the games component is a toy or card.

35. A games apparatus comprising a base module and a games component, the base module comprising:

a housing associated with a games component surface for a games component and also associated with a mechanical actuator configured to cause a mechanical action to occur;

a reader comprising a processor configured to control the provision of a drive signal at a predetermined frequency and to control operation of the mechanical actuator; and a first inductive circuit portion positioned adjacent the games component surface and coupled to receive the drive signal;

the games component comprising:

a memory storing mechanical movement data;

a second inductive circuit portion that couples inductively to the first inductive circuit portion when the games component is placed on or is in proximity to the games component surface;

a power deriver coupled to the second inductive circuit portion to derive a power supply from the inductive coupling of the drive signal to the second inductive circuit portion;

a data reader configured to read mechanical movement data from the memory in response to the power deriver deriving a power supply from the inductive coupling of the drive signal to the second inductive circuit portion; and a modulator configured to vary a loading on the second inductive circuit portion in accordance with the mechanical movement data read by the data reader whereby in operation the inductive coupling of the first and second inductive coupling portions causes the drive signal in the first inductive circuit portion to be modulated in accordance with the variation in loading on the second inductive circuit portion to produce a mechanical movement data modulated signal;

and the base module reader further comprising:

a modulation detector coupled to the first inductive circuit portion to receive the modulated signal, the detector being configured to detect the modulation and to provide a data signal representing the detected modulation and thus the mechanical movement data read by the data reader of the games component, the modulation detector also being coupled to supply the data signal to the processor, the processor being configured to control the mechanical actuator to cause a mechanical action to occur in accordance with the data signal received from the modulation detector in accordance with the mechanical movement data stored in the memory of the games component.

36. The games apparatus according to claim 35, wherein the mechanical actuator is configured to control a mechanical action of an arm.

37. The games apparatus according to claim 35, wherein the games component is selected from one of a Figure, toy character, model and card.

38. The games apparatus according to claim 35, wherein the games apparatus is a toy and the games component is a toy component.

39. The games apparatus according to claim 35, wherein the games component is a toy or card.

40. A games apparatus comprising a base module and a games component, the base module comprising:

a housing associated with a games component surface for a games component and also associated with an output device configured to output data to a user;

a reader comprising a processor configured to control the provision of a drive signal at a predetermined frequency and to control operation of the output device; and a first inductive circuit portion positioned adjacent the games component surface and coupled to receive the drive signal;

the games component comprising:

a memory storing program data;

a second inductive circuit portion that couples inductively to the first inductive circuit portion when the games component is placed on or is in proximity to the games component surface;

a power deriver coupled to the second inductive circuit portion to derive a power supply from the inductive coupling of the drive signal to the second inductive circuit portion;

a data reader configured to read program data from the memory in response to the power deriver deriving a power supply from the inductive coupling of the drive signal to the second inductive circuit portion; and a modulator configured to vary a loading on the second inductive circuit portion in accordance with the program data read by the data reader whereby the inductive coupling of the first and second inductive coupling portions causes the drive signal in the first inductive circuit portion to be modulated in accordance with the variation in loading on the second inductive circuit portion to produce a program data modulated signal;

and the base module reader further comprising:

a modulation detector coupled to the first inductive circuit portion to receive the modulated signal, the detector being configured to detect the modulation and to provide a data signal representing the detected modulation and thus the program data read by the data reader of the games component, the modulation detector also being coupled to supply the data signal to the processor, the processor being configured to process the program data represented by the data signal received from the modulation detector whereby, in use, the operation of the processor is modified in accordance with the program data stored in the memory of the games component.

41. The games apparatus according to claim 40, further comprising at least one further such game component wherein the memory storing information data rather than program data, and wherein the processor is configured such that when the at least one further games component is placed on or is in proximity to the games component surface information data stored in its memory is supplied to the processor via the inductive coupling by which the at least one further games component derives a power supply and the processor controls operation of at least one of the games apparatus and the output device in accordance with the information data with the operation of the processor being dependent on whether or not the processor has previously been programmed by program data supplied by placing the games component on the games component surface.

42. The games apparatus according to claim 41, wherein the games apparatus is a toy and the games component is a toy component.

43. The games apparatus according to claim 41, wherein the games component is a toy or card.

44. The games apparatus according to claim 40, wherein the games component is selected from one of a Figure, toy character, model and card.

45. The games apparatus according to claim 40, wherein the games apparatus is a toy and the games component is a toy component.

46. The games apparatus according to claim 40, wherein the games component is a toy or card.

47. A games apparatus comprising a base module and a games component, the base module comprising:

a housing associated with a games component surface for a games component and also associated with an output device comprising at least one of a display and a loudspeaker configured to output data to a user;

a reader comprising a processor configured to control the provision of a drive signal at a predetermined frequency and to control operation of the output device; and a first inductive circuit portion positioned adjacent the games component surface and coupled to receive the drive signal, the games component comprising:

a memory storing data comprising information data of at least one type selected from audio, display, electrical, mechanical and program data and header data identifying the type of information data;

a second inductive circuit portion that couples inductively to the first inductive circuit portion when the games component is placed on or is in proximity to the games component surface;

a power deriver coupled to the second inductive circuit portion to derive a power supply from the inductive coupling of the drive signal to the second inductive circuit portion;

a data reader configured to read data from the memory in response to the power deriver deriving a power supply from the inductive coupling of the drive signal to the second inductive circuit portion; and a modulator configured to vary a loading on the second inductive circuit portion in accordance with the data read by the data reader whereby in operation the inductive coupling of the first and second inductive coupling portions causes the drive signal in the first inductive circuit portion to be modulated in accordance with the variation in loading on the second inductive circuit portion to produce a data modulated signal;

and the base module reader further comprising:

a modulation detector coupled to the first inductive circuit portion to receive the modulated signal, the detector being configured to detect the modulation and to provide a data signal representing the detected modulation and thus the data read by the data reader of the games component, the modulation detector also being coupled to supply the data signal to the processor, the processor being configured to identify from the header data the type of information data and to process the information data in accordance with the identified type of data so as to control operation of at least one of the games apparatus and the output device.

48. The games apparatus according to claim 47, wherein the games component is selected from one of a Figure, toy character, model and card.

49. The games apparatus according to claim 47, wherein the games apparatus is a toy and the games component is a toy component.

50. The games apparatus according to claim 47, wherein the games component is a toy or card.

51. A games apparatus comprising a base module and a games component, the base module comprising:

a housing associated with a games component surface for supporting a games component and also associated with a output device configured to output data to a user;

a reader comprising a processor configured to control the provision of a drive signal at a predetermined frequency and to control operation of the output device; and a first inductive circuit portion positioned adjacent the games component surface and coupled to receive the drive signal;

the games component comprising a memory storing data, a second inductive circuit portion that couples inductively to the first inductive circuit portion when the games component is placed on or is in proximity to the games component surface, a power deriver coupled to the second inductive circuit portion to derive a power supply from the inductive coupling of the drive signal to the second inductive circuit portion, a data reader configured to read data from the memory in response to the power deriver deriving a power supply from the inductive coupling of the drive signal to the second inductive circuit portion, the data reader comprising a clock signal deriver configured to derive a clock signal from the drive signal and coupled to supply the clock signal to the memory to cause data to be read from the memory in accordance with the clock signal, and a modulator configured to vary a loading on the second inductive circuit portion in accordance with the data read by the data reader whereby in operation the inductive coupling of the first and second inductive coupling portions causes the drive signal in the first inductive circuit portion to be modulated in accordance with the variation in loading on the second inductive circuit portion to produce a data modulated signal, and the base module reader further comprising a modulation detector coupled to the first inductive circuit portion to receive the modulated signal, the detector being configured to detect the modulation and to provide a data signal representing the detected modulation and thus the data read by the data reader of the games component, the modulation detector also being coupled to supply the data signal to the processor, the processor being configured to control the output device to output data in accordance with the data signal received from the modulation detector and representing the data stored in the memory of the games component.

52. The games apparatus according to claim 51, wherein the data reader further comprises an exclusive-OR gate comprising first and second inputs and an output with the first input being coupled to receive the clock signal and the second input being coupled to receive data read from the memory, the clock signal deriver and memory being arranged to cause data to be read from the memory at a rate half a rate of the clock signal whereby when a data bit is read from the memory two bits are output by the exclusive-OR gate so that one of a digital one and zero is represented as 10 and the other is represented as 01.

53. The games apparatus according to claim 51, wherein the games apparatus is a toy and the games component is a toy component.

54. The games apparatus according to claim 51, wherein the games component is a toy or card.

55. A games apparatus comprising a base module and a games component, the base module comprising:

a housing associated with an output device configured to output data to a user;

a reader comprising a processor configured to control the provision of a drive signal at a predetermined frequency and to control operation of the output device; and a first inductive circuit portion coupled to receive the drive signal;

the games component comprising:

a memory storing user-specific data specific to a bearer of the games component, a second inductive circuit portion that couples inductively to the first inductive circuit portion when the games component is placed adjacent the base module, a power deriver coupled to the second inductive circuit portion to derive a power supply from the inductive coupling of the drive signal to the second inductive circuit portion, a data reader configured to read user-specific data from the memory in response to the power deriver deriving a power supply from the inductive coupling of the drive signal to the second inductive circuit portion, and a modulator configured to vary a loading on the second inductive circuit portion in accordance with the user-specific data read by the data reader whereby in operation the inductive coupling of the first and second inductive coupling portions causes the drive signal in the first inductive circuit portion to be modulated in accordance with the variation in loading on the second inductive circuit portion to produce a user-specific data modulated signal;

and the base module reader further comprising a modulation detector coupled to the first inductive circuit portion to receive the modulated signal, the detector being configured to detect the modulation and to provide a data signal representing the detected modulation and thus the user-specific data read by the data reader of the games component, the modulation detector also being coupled to supply the data signal to the processor, the processor being configured to compare the user-specific data with at least one of the bearer and information known only to the bearer of the games component.

56. A ball game comprising a base module and a ball, the base module comprising:

a housing associated with a support surface supporting a goal and also associated with an output device configured to output user data to a user;

a reader comprising a processor configured to control the provision of a drive signal at a predetermined frequency and to control operation of the output device; and a first inductive circuit portion positioned adjacent the goal and coupled to receive the drive signal, the ball comprising:

a memory storing data, a second inductive circuit portion that couples inductively to the first inductive circuit portion when the ball passes through the goal, a power deriver coupled to the second inductive circuit portion to derive a power supply from the inductive coupling of the drive signal to the second inductive circuit portion, a data reader configured to read data from the memory in response to the power deriver deriving a power supply from the inductive coupling of the drive signal to the second inductive circuit portion, and a modulator configured to vary a loading on the second inductive circuit portion in accordance with the data read by the data reader whereby in operation the inductive coupling of the first and second inductive coupling portions causes the drive signal in the first inductive circuit portion to be modulated in accordance with the variation in loading on the second inductive circuit portion to produce a data modulated signal, and the base module reader further comprising:

a modulation detector coupled to the first inductive circuit portion to receive the modulated signal, the detector being configured to detect the modulation and to provide a data signal representing the detected modulation and thus the data read by the data reader of the ball, the modulation detector also being coupled to supply the data signal to the processor to enable the processor to control the output device in response to receipt of the data signal as the ball passes through the goal.

57. A base module for a games apparatus, the base module comprising a housing associated with a games component surface for a games component comprising a memory storing display data and also associated with a display configured to display output data to a user, the base module further comprising:

a reader comprising a processor configured to control the provision of a drive signal at a predetermined frequency and to control operation of the display;

a first inductive circuit portion positioned adjacent the games component surface and coupled to receive the drive signal, the first inductive circuit portion being configured to couple inductively to a second inductive circuit portion of the games component when the games component is placed on or is in proximity to the games component surface to enable the games component to derive a power supply from the inductive coupling of the drive signal to the second inductive circuit portion and, when powered, to modulate a loading on the second inductive circuit portion in accordance with the display data read from the memory of the games component whereby in operation the inductive coupling of the first and second inductive coupling portions causes the drive signal in the first inductive circuit portion to be modulated in accordance with the variation in loading on the second inductive circuit portion to produce a display data modulated signal; and a modulation detector coupled to the first inductive circuit portion to receive the display data modulated signal, the modulation detector being configured to detect the modulation and to provide a data signal representing the detected modulation and thus the display data read by the data reader of the games component, the modulation detector also being coupled to supply the data signal to the processor, the processor being configured to control the display to display an image in accordance with the data signal received from the modulation detector and representing display data stored in the memory of the games component.

58. A games component for use with a games apparatus comprising a base module, the base module comprising a housing, the housing associated with a games component surface for supporting a games component and also associated with a display configured to display output data to a user, the base module further comprising a reader, the reader comprising a processor configured to control the provision of a drive signal at a predetermined frequency and to control operation of the display and the base module further comprising a first inductive circuit portion positioned adjacent the games component surface and coupled to receive the drive signal, the games component comprising:

a memory storing display data;

a second inductive circuit portion configured to couple inductively to the first inductive circuit portion when the games component is placed on or is in proximity to the games component surface;

a power deriver coupled to the second inductive circuit portion to derive a power supply from the inductive coupling of the drive signal to the second inductive circuit position;

a data reader configured to read display data from the memory in response to the power deriver deriving a power supply from the inductive coupling of the drive signal to the second inductive circuit portion; and a modulator configured to vary a loading on the second inductive circuit portion in accordance with the display data read by the data reader whereby, when the games component is placed on or is in proximity to the games component surface of the base module, the inductive coupling of the first and second inductive coupling portions causes the drive signal in the first inductive circuit portion to be modulated in accordance with the variation in loading on the second inductive circuit portion to produce a display data modulated signal, and the base module detects the modulation to provide a data signal which the processor uses to control the display to display an image in accordance with the data signal and representing display data stored in the memory of the games component.

59. A base module for a games apparatus, the base module comprising a housing, the housing associated with a games component surface for a games component comprising a memory storing audio data and also associated with a loudspeaker configured to output an audio signal to a user, the base module further comprising:

a reader comprising a processor configured to control the provision of a drive signal at a predetermined frequency and to control operation of the loudspeaker;

a first inductive circuit portion positioned adjacent the games component surface and coupled to receive the drive signal, the first inductive circuit portion being configured to couple inductively to a second inductive circuit portion of the games component when the games component is placed on or is in proximity to the games component surface to enable the games component to derive a power supply from the inductive coupling of the drive signal to the second inductive circuit portion and, when powered, to modulate a loading on the second inductive circuit portion in accordance with the audio data read from the memory of the games component whereby in operation the inductive coupling of the first and second inductive coupling of the first and second inductive coupling portions causes the drive signal in the first inductive circuit portion to be modulated in accordance with the variation in loading on the second inductive circuit portion to produce an audio data modulated signal; and a modulation detector coupled to the first inductive circuit portion to receive the audio data modulated signal, the modulation detector being configured to detect the modulation and to provide a data signal representing the detected modulation and thus the audio data read by the data reader of the games component, the modulation detector also being coupled to supply the data signal to the processor, the processor being configured to control the loudspeaker to emit an audio signal in accordance with the data signal received from the modulation detector and representing audio data stored in the memory of the games component.

60. A games component for use with a games apparatus comprising a base module, the base module comprising a housing, the housing associated with a games component surface for a games component and also associated with a loudspeaker configured to output an audio signal to a user, the base module further comprising a reader, the reader comprising a processor configured to control the provision of a drive signal at a predetermined frequency and to control operation of the loudspeaker and the base module further comprising a first inductive circuit portion positioned adjacent the games component surface and coupled to receive the drive signal, the games component comprising:

a memory storing audio data;

a second inductive circuit portion configured to couple inductively to the first inductive circuit portion when the games component is placed on or is in proximity to the games components surface;

a power deriver coupled to the second inductive circuit portion to derive a power supply from the inductive coupling of the drive signal to the second inductive circuit portion;

a data reader configured to read audio data from the memory in response to the power deriver deriving a power supply from the inductive coupling of the drive signal to the second inductive circuit portion; and a modulator configured to vary a loading on the second inductive circuit portion in accordance with the audio data read by the data reader whereby, when the games component is placed on or is in proximity to the games components surface of the base module, the inductive coupling of the first and second inductive coupling portions causes the drive signal in the first inductive circuit portion to be modulated in accordance with the variation in loading on the second inductive circuit portion to produce an audio data modulated signal, and the base module detects the modulation to provide a data signal which the processor uses to control the loudspeaker to emit an audio signal in accordance with the data signal and representing audio data stored in the memory of the games component.

61. A base module for a games apparatus, the base module comprising a housing, the housing associated with a games component surface for a games component comprising a memory storing mechanical movement data and also associated with a mechanical actuator configured to cause a mechanical action to occur, the base module further comprising:

a reader comprising a processor configured to control the provision of a drive signal at a predetermined frequency and to control operation of the mechanical actuator;

a first inductive circuit portion positioned adjacent the games component surface and coupled to receive the drive signal, the first inductive circuit portion being configured to couple inductively to a second inductive circuit portion of the games component when the games component is placed on or is in the proximity to the games component surface to enable the games component to derive a power supply from the inductive coupling of the drive signal to the second inductive circuit portion and, when powered, to modulate a loading on the second inductive circuit portion in accordance with the mechanical movement data read from the memory of the games component whereby in operation the inductive coupling of the first and second inductive coupling portions causes the drive signal in the first inductive circuit portion to be modulated in accordance with the variation in loading on the second inductive circuit portion to produce a mechanical movement data modulated signal; and a modulation detector coupled to the first inductive circuit portion to receive the mechanical movement data modulated signal, the modulation detector being configured to detect the modulation and to provide a data signal representing the detected modulation and thus the mechanical movement data read by the data reader of the games component, the modulation detector also being coupled to supply the data signal to the processor, the processor being configured to control the mechanical actuator to cause a mechanical action to occur in accordance with the data signal received from the modulation detector and representing mechanical movement data stored in the memory of the games component.

62. A games component for use with a games apparatus comprising a base module, the base module comprising a housing, the housing associated with a games component surface for a games component and also associated with a mechanical actuator configured to cause a mechanical action to occur, the base module further comprising a reader, the reader comprising a processor configured to control the provision of a drive signal at a predetermined frequency and to control operation of the mechanical actuator and the base module further comprising a first inductive circuit portion positioned adjacent the games component surface and coupled to receive the drive signal, the games component comprising:

a memory storing mechanical movement data;

a second inductive circuit portion configured to couple inductively to the first inductive circuit portion when the games component is placed on or is in proximity to the games component surface;

a power deriver coupled to the second inductive circuit portion to derive a power supply from the inductive coupling of the drive signal to the second inductive circuit portion;

a data reader configured to read mechanical movement data from the memory in response to the power deriver deriving a power supply from the inductive coupling of the drive signal to the second inductive circuit portion; and a modulator configured to vary a loading on the second inductive circuit portion in accordance with the mechanical movement data read by the data reader whereby, when the games component is placed on or is in proximity to the games components surface of the base module, the inductive coupling of the first and second inductive coupling portions causes the drive signal in the first inductive circuit portion to be modulated in accordance with the variation in loading on the second inductive circuit portion to produce a mechanical movement data modulated signal, and the base module detects the modulation to provide a data signal which the processor uses to control the mechanical actuator to produce a mechanical movement in accordance with the data signal and representing mechanical movement data stored in the memory of the games component.

63. A base module for a games apparatus, the base module comprising a housing, the housing associated with a games component surface for a games component comprising a memory storing program data and also associated with an output device configured to output data to a user, the base module further comprising:

a reader comprising a processor configured to control the provision of a drive signal at a predetermined frequency and to control operation of the output device;

a first inductive circuit portion positioned adjacent the games component surface and coupled to receive the drive signal, the first inductive circuit portion being configured to couple inductively to a second inductive circuit portion of the games component when the games component is placed on or is in proximity to the games component surface to enable the games component to derive a power supply from the inductive coupling of the drive signal to the second inductive circuit portion and, when powered, to modulate a loading on the second inductive circuit portion in accordance with the program data read from the memory of the games component whereby in operation the inductive coupling of the first and second inductive coupling portions causes the drive signal in the first inductive circuit portion to be modulated in accordance with the variation in loading on the second inductive circuit portion to produce a program data modulated signal; and a modulation detector coupled to the first inductive circuit portion to receive the program data modulated signal, the modulation detector being configured to detect the modulation and to provide a data signal representing the detected modulation and thus the program data read by the data reader of the game component, the modulation detector also being coupled to supply the data signal to the processor, the processor being configured to process the program data represented by the data signal received from the modulation detector whereby in use operation of the processor is modified in accordance with the program data memory of the games component.

64. A games component for use with a game apparatus comprising a base module, the base module comprising a housing, the housing associated with a games component surface for a games component and also associated with an output device configured to output data to a user, the base module further comprising a reader, the reader comprising a processor configured to control the provision of a drive signal at a predetermined frequency and to control operation of the display and the base module further comprising a first inductive circuit portion positioned adjacent the games component surface and coupled to receive the drive signal, the games component comprising:

a memory storing program data;

a second inductive circuit portion configured to couple inductively to the first inductive circuit portion when the games component is placed on or is in proximity to the games component surface;

a power deriver coupled to the second inductive circuit portion to derive a power supply from the inductive coupling of the drive signal to the second inductive circuit portion;

a data reader configured to read program data from the memory in response to the power deriver deriving a power supply from the inductive coupling of the drive signal to the second inductive circuit portion; and a modulator configured to vary a loading on the second inductive circuit portion in accordance with the program data read by the data reader whereby, when the games component is placed on or is in proximity to the games component surface of the base module, the inductive coupling of the first and second inductive coupling portions causes the drive signal in the first inductive circuit portion to be modulated in accordance with the variation in loading on the second inductive circuit portion to produce a program data modulated signal, and the base module detects the modulation to provide a data signal which is processed by the processor to modify the operation of the processor.

* * * * *

UNITED STATES PATENT AND TRADEMARK OFFICE
CERTIFICATE OF CORRECTION

PATENT NO. : 6,650,870 B2
DATED : November 18, 2003
INVENTOR(S) : White et al.

It is certified that error appears in the above-identified patent and that said Letters Patent is hereby corrected as shown below:

<u>Title page,</u>
Item [75], Inventors, "Andrew W White," should read -- Andrew D. White, --; and "Spencer Wood" should read -- Spencers Wood --.

<u>Column 8,</u>
Line 33, "claim 11," should read -- claim 1, --.
Line 50, "model." should read -- model or card. --.

<u>Column 19,</u>
Lines 2, 15 and 36, "components" should read -- component --.

Signed and Sealed this

Eighteenth Day of May, 2004

JON W. DUDAS
*Acting Director of the United States Patent and Trademark Office*